C. H. MANNING.
Tan-Vats.
No. 8,639. Reissued Mar. 25, 1879.
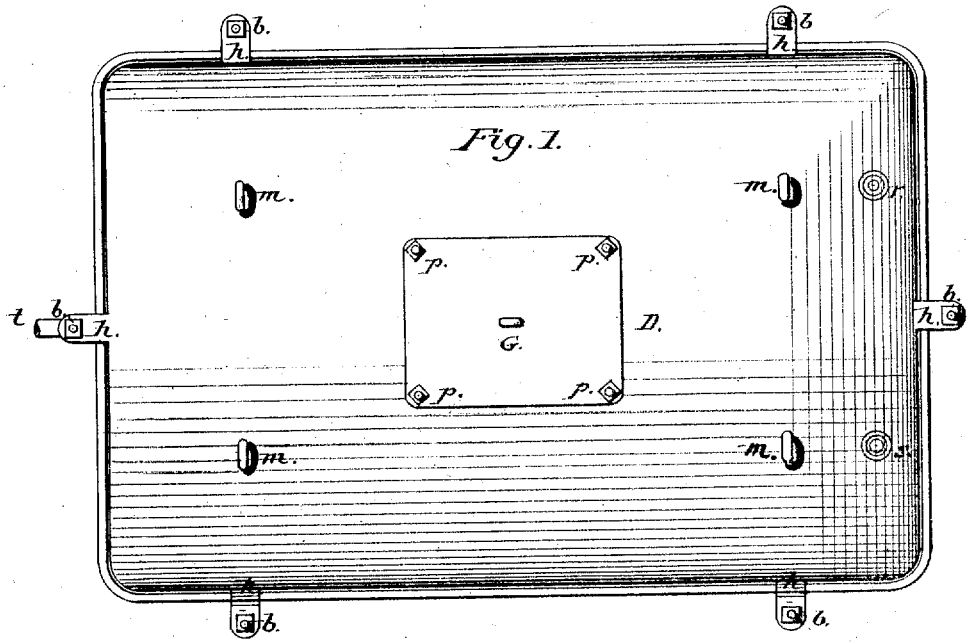
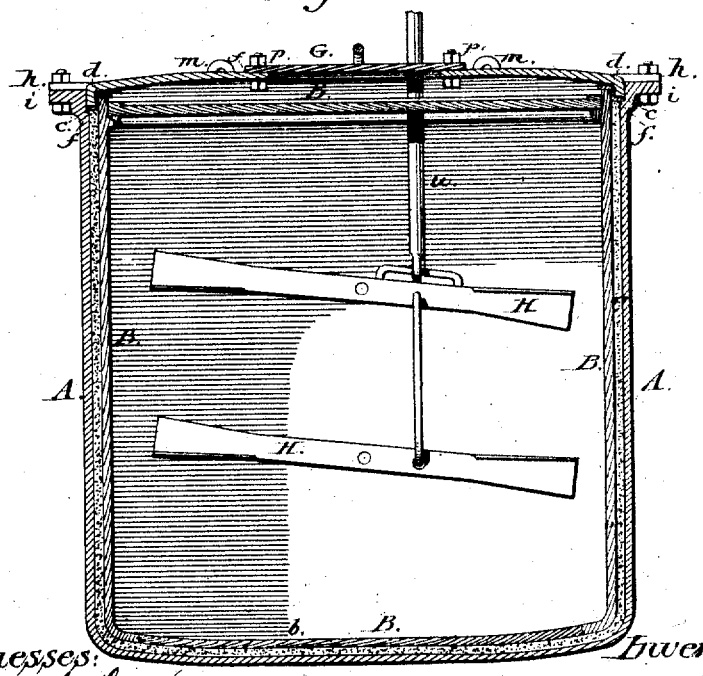
Witnesses:
Edw. W. Bond.
Geo. F. Graham
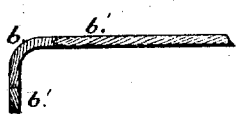
Inventor:
Chas. H. Manning

UNITED STATES PATENT OFFICE.

CHARLES H. MANNING, OF WASHINGTON, DISTRICT OF COLUMBIA.

IMPROVEMENT IN TAN-VATS.

Specification forming part of Letters Patent No. 135,232, dated January 28, 1873; Reissue No. 8,639, dated March 25, 1879; application filed June 12, 1878.

*To all whom it may concern:*

Be it known that I, CHARLES H. MANNING, of Washington, in the county of Washington and District of Columbia, have invented an Improved Tan-Vat; and I do hereby declare that the following is a full and exact description thereof, reference being had to the accompanying drawings, making part of this specification—

Figure 1 being a top view of the vat; Fig. 2, a transverse vertical section of the same; Fig. 3, view of a part detached.

Like letters designate corresponding parts in all of the figures.

My improved tan-vat, although applicable for other processes of tanning, is especially intended to be used with the vacuum and pressure processes of tanning.

The main feature of the invention consists in the construction of the vat of suitable form, of metal, of such thickness and strength in proportion to size as is required to sustain the pressure in vacuum and pressure processes of tanning, said vat to be lined inside with a thickness of wood and a layer of pitch, tar, asphaltum, cement, or equivalent substance, that will secure the surface of the metal from contact with the tan-liquor; second, in the construction of a tan-vat, as described, of metal, the interior surface of which may be enameled or galvanized with any suitable substance.

A in the accompanying drawings represents the metal vat. It should be rounded at the corners, and the bottom concaved or curved, as also the sides, which are a little flaring, so that the pattern will draw readily from the sand of the mold, if cast.

Between the metal body and the wooden lining is a space, C, of, say, half an inch thick, to be filled with pitch, tar, asphaltum, cement or other suitable substance, which will completely shield the surface of the metal from oxidation, and consequent discoloration of the leather.

This wooden lining may be dispensed with, and the inner surface of the metal vat be enameled or galvanized, if preferred.

The top or cover is also made of metal, curved, and lined with wood in the same way as the vat, or galvanized or enameled.

The top or cover of the vat has a rim or flange, as also the vat, between which is placed the rubber packing-gaskets *f f*. A man-hole is formed in the top, covered by a plate, G, and fastened to the vat by bolts *p p*, or other equivalents.

A tube or pipe for exhausting and condensing pump is secured in the vat. A safety and pressure gage, and an outlet or pipe, *t*, is formed at or near the bottom, through which the tan-liquor is introduced or drawn off.

Agitators H H, for stirring the tan-liquor, are mounted inside the vat, to be worked by means of a connecting-rod, *u*, through the vat. Thus access can be had to the inside of the vat, and agitation of the liquor therein can be effected.

What I claim as my invention, and desire to secure by Letters Patent, is—

1. As an improved article of manufacture, a metal tan-vat adapted for the vacuum and pressure process of tanning, having its interior surface enameled or galvanized, and a cover, all substantially as shown and described.

2. A tan-vat of metal, lined inside with wood, and with a layer or thickness of pitch, tar, asphaltum, cement, or their equivalent, between the metal and wood, substantially as and for the purpose herein specified.

3. A tan-vat having its inner surface coated with a layer of pitch, tar, asphaltum, cement, or other suitable substance, for the purpose specified.

CHAS. H. MANNING.

Witnesses:
JOHN D. HYER,
PAUL ARNOLD.